United States Patent [19]

Frielingsdorf

[11] 4,416,679
[45] Nov. 22, 1983

[54] TRANSPORT SYSTEM FOR HEATED GLASS PANES AND METHOD OF TRANSPORTING GLASS PANES

[76] Inventor: Horst Frielingsdorf, Am Meisenhort 2, 5630 Remscheid, 11, Fed. Rep. of Germany

[21] Appl. No.: 362,129

[22] Filed: Mar. 26, 1982

[30] Foreign Application Priority Data

Apr. 3, 1981 [DE] Fed. Rep. of Germany ....... 3113410

[51] Int. Cl.³ .............................................. C03B 35/18
[52] U.S. Cl. ........................................ 65/118; 65/111; 65/119; 65/163; 65/348; 65/351
[58] Field of Search ................. 65/111, 118, 119, 163, 65/351, 348

[56] References Cited

U.S. PATENT DOCUMENTS 4,356,912 11/1982 Nitschke ........................... 65/163 X
4,360,374 11/1982 Nitschke ............................... 65/348

FOREIGN PATENT DOCUMENTS 490119 1/1930 Fed. Rep. of Germany .
494248 3/1930 Fed. Rep. of Germany .
704219 3/1941 Fed. Rep. of Germany .

Primary Examiner—Arthur D. Kellogg
Attorney, Agent, or Firm—Karl F. Ross; Herbert Dubno

[57] ABSTRACT

Hot glass panes are displaced without sagging through a treatment station, such as an oven, on a roller grate which is linearly reciprocated while the rollers of the grate receive a translatory angular velocity component and an angular oscillation so that the velocity at a glass pane relative to the traveling grate is $R \cdot \omega_{osc} + R \cdot \omega_{trans}$, where R is the radius of the rollers at a point of contact with the pane, $\omega_{osc}$ is the angular oscillation velocity component of the roller displacement and $\omega_{trans}$ is the angular translatory component.

7 Claims, 5 Drawing Figures

TRANSPORT SYSTEM FOR HEATED GLASS PANES AND METHOD OF TRANSPORTING GLASS PANES

FIELD OF THE INVENTION

The present invention relates to a transport system for heated glass panes and, more particularly, to an apparatus for the transport of heated glass panes and/or glass panes to be heated, especially in a prestressing installation for glass panes, sheets or plates.

BACKGROUND OF THE INVENTION

It is known to provide, in the production of glass panes, plates or sheets (hereinafter referred to generally as "panes") a roller conveyor or grate which can transport a glass pane through a treatment station. For example, when the glass panes have been heated previously or are in a heated state after an earlier operation, the hot glass panes can be carried by such a conveyor through a controlled/cooling station or some other treatment station conventional in the Art. Alternatively, or in addition, the glass pane can be heated on the conveyor, e.g. in a heat treatment oven, furnace or kiln.

Since the heating of glass tends to soften it, there is always the danger that the transport of heated glass panes and roller conveyors, traveling grates or the like may result in some sag of the glass between the support locations.

Thus, it is known to provide arrangements for minimizing this sag. For example, in German Patent No. 740,219 (FIG. 1 and page 2, lines 32 through 58), the glass panes are fed through the treatment station or stations with a unidirectional translation velocity component of the glass corresponding to the transport velocity, and within the treatment station are given a back-and-forth motion by angular oscillation of the support rollers. The treatment is carried out while the panes are moved in this manner.

When treatment is terminated, the translatory component is imparted to the glass panes by displacement of the rollers after the oscillating or back-and-forth movement is terminated.

While the back-and-forth or oscillating movements promote treatment and minimize sag during the treatment, there is always a danger of sag as the glass panes are transported after the treatment. Furthermore, since the forward travel of the glass panes is not continuous during the treatment the movement of the glass panes through the treatment station or stations is intermittent with interruption in transport within the treatment stations while the oscillations are imparted to the glass panes.

These complex movements require a complicated glass displacement apparatus, do not eliminate the danger of sag at all points at which a heated glass pane is supported by the conveyor, and contributes to limiting the capacity of the plant to process the glass panes. These problems are especially pronounced (particularly with respect to the danger of sag) when extremely high temperatures are utilized as part of the treatment, i.e. where the glass is supported within an oven or furnace.

It is also known to avoid the sagging problem for continuously displacing the glass panes through the treatment station by operating the conveyor at extremely high speeds, whether continuously, in steps or with interruptions. In such systems the danger of sag remains as the speed is reduced and hence the speed must be maintained at such a high level that treatment stations are prohibitively long for a given residence time. The cost of such apparatus is also prohibitive.

OBJECTS OF THE INVENTION

It is the principal object of the present invention to provide an apparatus for the transport of hot glass panes whereby the disadvantages of earlier systems are avoided.

Still another object of this invention is to provide a glass-pane transport system which is capable of carrying the glass panes continuously through a treatment station while nevertheless eliminating the danger of sagging.

Still another object of this invention is to provide an improved method of operating a glass-handling conveyor and especially a roller-grate conveyor.

SUMMARY OF THE INVENTION

These objects and others which will become apparent hereinafter are attained, in accordance with the invention, by transporting the glass panes through the treatment station on a roller-grate conveyor, i.e. a conveyor having upper and lower passes and formed with spaced-apart rollers upon which the glass panes rest, the rollers having diameters D and radii R in the regions at which they contact the glass panes.

According to the invention, the glass panes are displaced by a resultant velocity component continuously through the treatment station, this velocity component being made up of a roller translatory component $R \cdot \omega_{trans}$, where $\omega_{trans}$ is the translatory angular velocity of the roller. In addition to this component, a component is contributed by an oscillatory angular velocity $\omega_{osc}$ which is superimposed on the translatory angular velocity. The term "angular velocity" is here used in its conventional sense to refer to revolutions per unit time or angular displacement per unit time.

According to the invention, moreover, these components are established such that the glass pane moves relative to the roller grate with a glass pane relative velocity $V_p$ which equals $R \cdot \omega_{osc} + R \cdot \omega_{trans}$. Furthermore, according to the invention, the roller grate is given a back-and-forth or oscillating translatory velocity $V_{grate\ (osc)}$.

It has previously been pointed out that oscillation is known in connection with efforts to avoid sag. For example, in German patent No. 492,248 the grate is given a back-and-forth movement within the treatment furnace.

However, as far as it can be determined, it hitherto has not been recognized that such a back-and-forth displacement of a roller grate can be coupled with superimposed oscillatory and translatory angular displacement of the rollers to provide continuous transport of the glass plate through the station and yet avoid the sag problem.

Apparently this arrangement results in a relative displacement of the contact surfaces on the glass panes so that sag does not develop, even through the glass panes can move at relatively low speeds, the translatory oscillation of the grate, moreover, contributing to the effective treatmment and avoiding sag.

In a preferred embodiment of the present invention, the transport component of the roller displacement $R \cdot \omega_{trans}$ alone determines the direction of displacement of the glass panes, the angular oscillatory velocity components being established to fulfill the relationship $V_{grate\ (osc)} = -R \cdot \omega_{osc}$. In this relationship the contribution of the angular oscillation to the displacement of the glass panes is equal to but opposite the contribution of the translatory oscillation of the grate, i.e. the two oscillatory displacements are of equal amplitude and 180° out of phase.

Various systems can be used for driving the rollers and the grate. For example, the individual rollers can be provided with respective motors and speed-reducing transmissions and the control of the motor driving the grate and the motors driving the rollers can be effected by suitable information processing means, e.g. microprocessor based controllers.

Conventional mechanical coupling systems can be provided for coupling the various movements together.

It has been found that relatively effective results can be obtained when the roller drive is effected by a drive chain whose velocity $V_{chain}$ is equal to the transport component $R \cdot \omega_{trans}$ of the relative velocity of the glass panes or is proportional thereto, the grate being given its reciprocating movement by a drive independent from that of the chain and the angular velocity $\omega_{osc}$ being generated by the relative movements of the grate and the chain.

The roller grate can be given its reciprocating displacement by a crank mechanism or a fluid-powered piston and cylinder arrangement.

When the angular velocity component of the rollers is provided by the relative displacement of the grate and the drive chain, it has been found to be advantageous to couple each roller with a sprocket engaged by the drive chain and having an effective diameter TK equal to the diameter D of the rollers.

One of the other advantages of the system of this invention is that control of the angular velocity and reciprocating components can be made to suit any glass processing condition so that simply by regulating the frequencies and amplitudes of the oscillations and reciprocations, sag and can be completely avoided. The traveling grate can have the rollers spaced relatively widely apart. The cost of the system is reduced and the treatment station need not be excessively long. In addition, cooling air can be blown between the transport rollers as described, for example, in German Patent No. 490,119.

BRIEF DESCRIPTION OF THE DRAWING

The above and other objects, features and advantages of the present invention will become more readily apparent by the following description, reference being made to the accompanying drawing in which.

SPECIFIC DESCRIPTION

Figure 1:
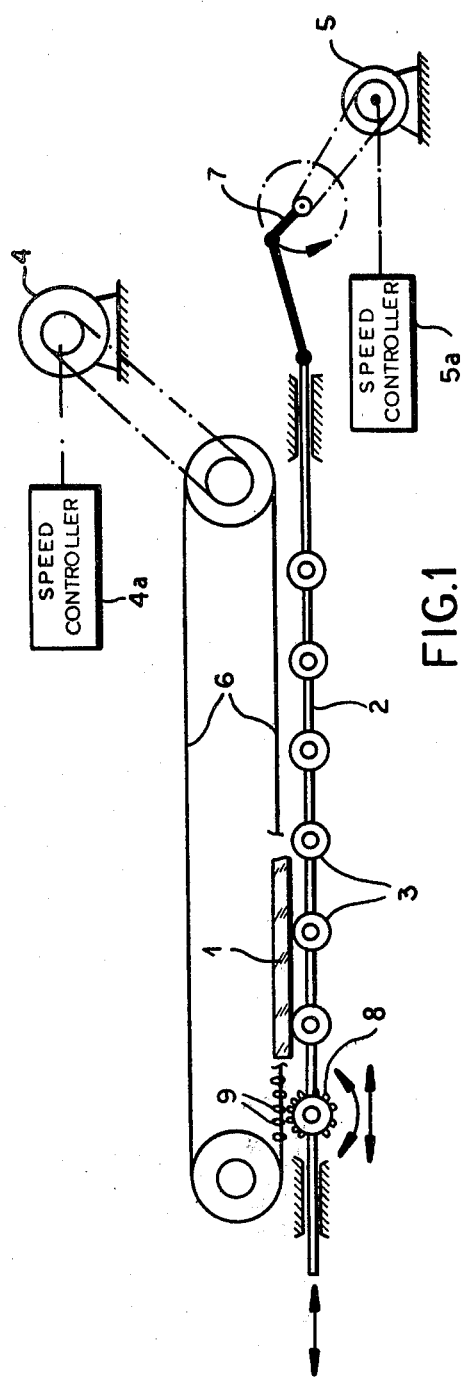
FIG. 1 is a diagrammatic side elevational view of a glass-handling apparatus in accordance with the present invention.
Figure 1A:
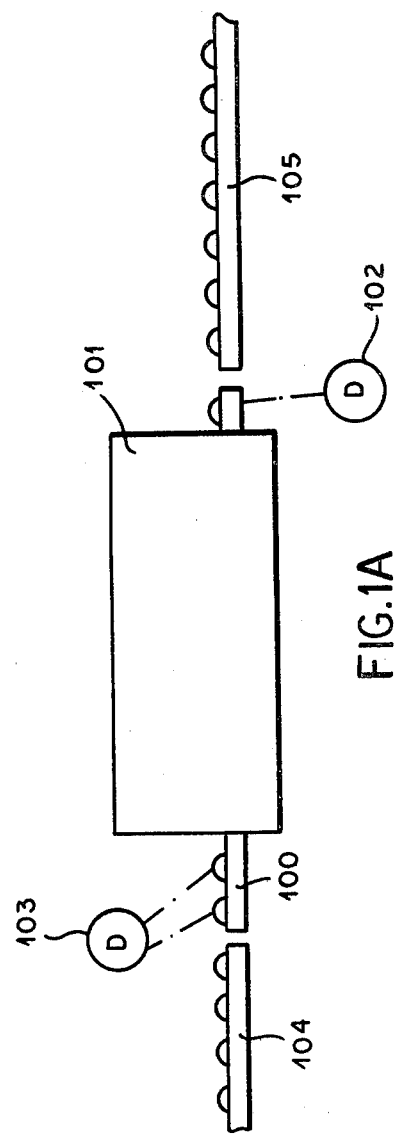
FIG. 1A is a diagram of the association of this apparatus with a treatment station according to the invention.
Figure 3:
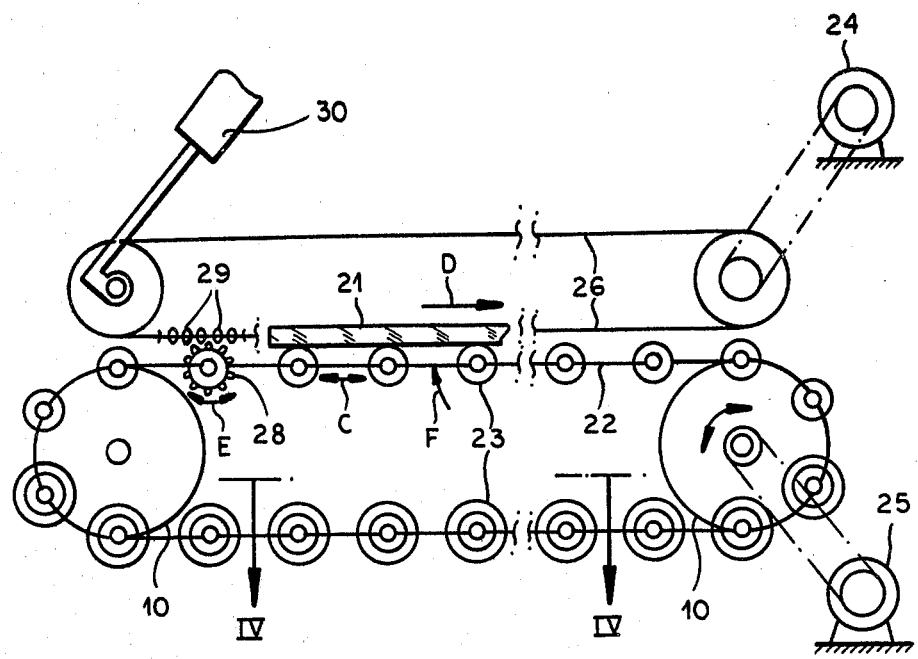
FIG. 3 is a view similar to FIG. 1 illustrating another embodiment of the invention.

Referring first to FIG. 1, it can be seen that a conveyor system 100, which can be of the type illustrated in FIG. 1 or the type shown in FIG. 3, can pass through a treatment station 101, e.g. a glass-heating oven. In general, the roller conveyor 100, which is reciprocated by a drive represented at 102, is associated with means represented by a drive 103 for imparting the angular velocities of the rollers.

Upstream and downstream of the roller conveyor 100, other conveying units 104 and 105 can also be provided, e.g. as roller conveyors, for bringing the glass pane to the conveyor 100 and carrying the heat treated glass panes therefrom.

Figure 2:
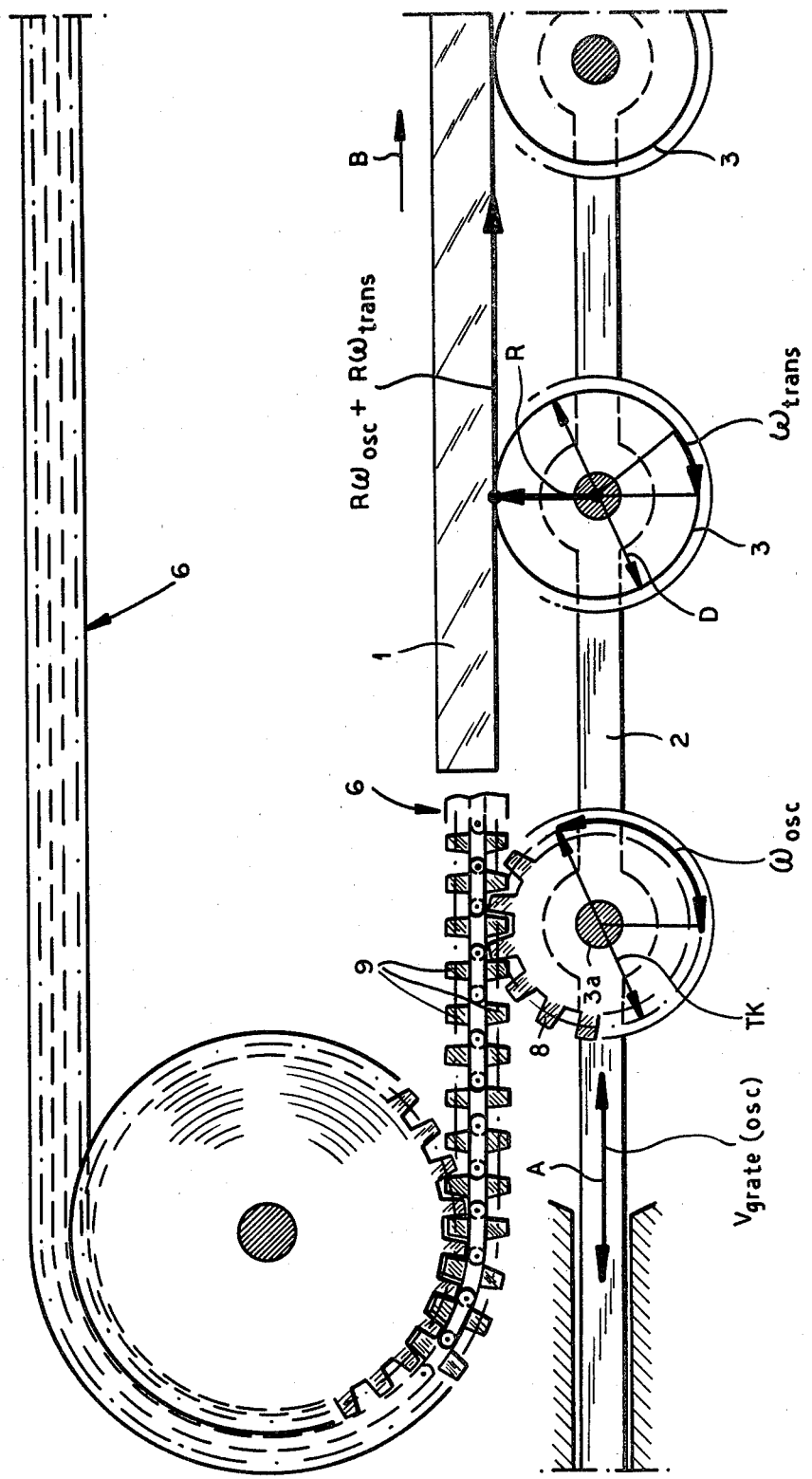
FIG. 2 is a detail view showing a portion of the device illustrated in FIG. 1 drawn to a larger scale and labeled to indicate the various components.

The apparatus shown in FIGS. 1 and 2 can be used for the displacement of hot glass panes 1 which may have a tendency to sag and preferably is used in association with a prestressing installation for such glass panes. While the station 101 is preferably an oven, it can also represent the hardening or cooling stations. In general, the invention is applicable wherever the glass panes are in a heated state which might cause them to sag.

Of course, when a cooling station is utilized as the treatment station, the wind boxes and the like for treating the glass panes with cooling air (not shown here) can be provided.

The conveyor in the embodiment of FIGS. 1 and 2 is a roller conveyor or grate 2 having a plurality of transport rollers 3 of a radius R. The rollers may be staggered from row to row and the rows have been shown in FIG. 1, a plurality of rollers being provided in each row with a common shaft 3a to which the rollers are keyed. Each shaft also carries a sprocket wheel 8.

Thus the array of rollers is simmilar to that of a conventional roller conveyor.

The rollers can be heated or cooled, can be provided with fluid passages to be traversed by heating or cooling fluids or can be associated with nozzles or the like for dispensing hot or cold air.

The roller grate 2 is connected by a crank drive 7 to a drive motor 5 so that a linear reciprocation with a velocity $V_{grate\ (osc)}$ is imparted to the roller grate.

In addition, the pinions 8 meshed with a drive chain 6 are driven by a motor 4 so that all of the rollers are synchronously rotated with an angular velocity $\omega_{trans}$.

Because the axes of the rollers are linearly translated through the displacement represented by the arrow in FIG. 2, there is superimposed upon the rollers by reason of the relative displacement of their axes and the meshing of teeth 9 of the chain with the sprockets $8_1$, an angular velocity oscillation $\omega_{osc}$.

The resultant roller contribution to the displacement of the pane 1 is $R \cdot \omega_{osc} + R \cdot \omega_{trans}$.

When $V_{grate\ (osc)}$ is equal to and opposite $R \cdot \omega_{osc}$ in amplitude and phase, the glass pane is displaced in the direction of arrow B continuously with the velocity $R \cdot \omega_{trans}$.

This relationship can be ensured by making an effective diameter of the pinion 8 represented by TK equal to the diameter D of the rollers 3.

Motor 4 can be a direct current motor, as can the motor 5 so that both motors can be provided with speed controllers 4a and 5a permitting the angular velocities of the roller and the reciprocation velocity of the grate to be varied with these.

Between the rollers 3, inserts can be provided to also support the glass pane at the level at which the glass pane is tangent to the rollers.

These additional supports can carry rollers which engage the underside of the glass pane and can be adjustable upon the roller grate as may be required.

Figure 4:
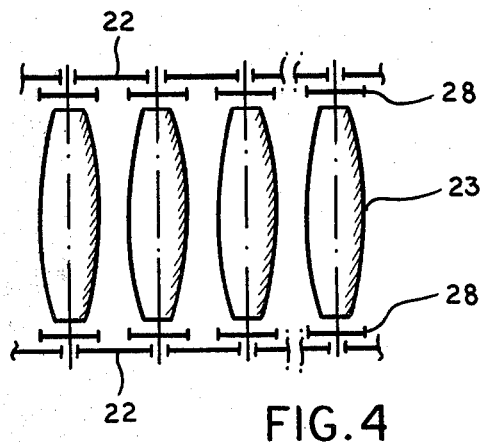
FIG. 4 is a section taken along the line IV—IV of FIG. 3.

In FIGS. 3 and 4, another embodiment has been illustrated in which the angular oscillation is imparted, not to a roller grate but to a traveling grate or chain 22 carrying the rollers 23 through support at pane 21. In this embodiment, the rollers 23 can have the configuration shown in FIG. 4, i.e. a single roller can extend the entire width of the traveling grate 22. The diameter R, of course, is measured where the roller contacts the glass panes.

Instead of barrel-shaped rollers, rollers with other configurations, i.e. doubly-bulged, hyperboloidal profile or cylindrical rollers can be used, especially when the glass bodies have complementary profiles.

Each roller is flanked by a pair of pinions 28 which mesh with respective chains 26, whose teeth 29 drive the pinions 28 continuously.

Since the reciprocation is imparted to the traveling grate as represented by the arrow C and the chains 26 are driven continuously by the motor 24 in the direction arrow D, the relative movement of the chain and the traveling grate ech imposes an angular oscillation E upon the rollers in addition to a drive component F in the manner previously described.

The conveyor chains 26 may be connected to a cylinder arrangement 30 to enable them to be swung away for maintenance or replacement of the rollers 23 of the traveling grate 22.

I claim:

1. In a glass-treatment apparatus in which glass bodies are displaced through a thermal treatment station, a glass-carrying conveyor system for carrying said bodies without sagging which coprises:
    a roller conveyor formed with a plurality of rollers reciprocating said body and having radii R in contact therewith;
    means for imparting a linear reciprocation $V_{grate(osc)}$ to said conveyor;
    means for imparting to said rollers an angular velocity component $\omega_{trans}$ in one sense, thereby contributing a linear velocity component $R \cdot \omega_{trans}$ to a pane supported thereby; and
    means for imparting an angular oscillation $\omega_{osc}$ to said rollers for contributing an oscillatory component $R \cdot \omega_{osc}$ to said panes whereby the relative displacement of said glass body and said roller conveyor is $R \cdot \omega_{osc} + R \cdot \omega_{trans}$, each of said rollers being provided at an end thereof with a respective sprocket wheel and said sprocket wheels mesh with a common pass of an endless chain.

2. The apparatus defined in claim 1 wherein $V_{grate(osc)} = -R \cdot \omega_{osc}$ and said conveyor is reciprocated in a direction opposite and with the same amplitude as the roller oscillatory component contributed to the relative displacement of said body and said conveyor and with the same frequency.

3. The apparatus defined in claim 1 or claim 2 wherein said rollers are provided with said sprocket wheels engaged by a chain and having a first drive, said roller conveyor being provided with a second drive.

4. The apparatus defined in claim 3 wherein said sprocket wheels have effective diameters equal to the diameters of said rollers in contact with said body.

5. A method of passing a hot glass pane through a treatment station without sagging of the pane which comprises the steps of:
    (a) supporting said pane on a roller grate in said treatment station;
    (b) imparting the linear reciprocating $V_{grate(osc)}$ to said grate while said pane is supported by said grate and traverses said station;
    (c) imparting to the rollers of said grate an angular velocity component $\omega_{trans}$ in a direction such that said component displaces said pane continuously through said station, said rollers having a radius R where they engage said pane; and
    (d) imparting an angular velocity oscillation $\omega_{osc}$ to said rollers whereby said pane is displaced relative to said grate at a velocity corresponding to $R \cdot \omega_{osc} + R \cdot \omega_{trans}$, rotation being imparted to said rollers by causing a sprocket wheel at an end of each of said rollers to mesh with a common pass of a drive chain.

6. The method defined in claim 5 wherein $V_{grate(osc)} = -R \cdot \omega_{osc}$.

7. In an apparatus for the manipulation of glass panes at a temperature which might cause said pane to sag between two supported locations, wherein a roller grate having a multiplicity of mutually parallel transversely spaced rollers is journaled on said grate and are driven by an endless roller drive element, and wherein the grate is connected to a reciprocating grate drive, the improvement which comprises in combination therewith:
    respective sprocket wheels formed on each of said rollers at one end thereof;
    a common pass of an endless drive chain engaging each of said sprocket wheels for rotating them in the same sense, said chain forming said element and being driven so that said pass move in the direction of displacement of said panes on said grate, said pass having a speed proportional to a linear velocity component imparted to said pane by said roller in said direction; and
    means for linearly reciprocating said grate with a linear reciprocation which is superimposed on the rotation imparted to said rollers that said rollers engage said pane with a back-and-forth angular oscillation, the latter means including a crank drive.

* * * * *